United States Patent [19]

Schneiter

[11] Patent Number: 4,890,860

[45] Date of Patent: Jan. 2, 1990

[54] WAFER GRAIN GAS GENERATOR

[75] Inventor: Fred E. Schneiter, North Ogden, Utah

[73] Assignee: Morton Thiokol, Inc., Chicago, Ill.

[21] Appl. No.: 143,908

[22] Filed: Jan. 13, 1988

[51] Int. Cl.$^4$ .......................... B60R 21/26; B01J 7/00
[52] U.S. Cl. .................................... 280/741; 422/166; 422/305; 29/157 R; 29/446
[58] Field of Search ............... 422/164, 165, 166, 167, 422/188, 218, 239, 305; 280/728, 736, 741, 742; 29/157 R, 446

[56] References Cited

U.S. PATENT DOCUMENTS

| | | | |
|---|---|---|---|
| 3,316,842 | 5/1967 | Schulz | 102/100 |
| 3,877,882 | 4/1975 | Lette et al. | 23/281 |
| 3,898,048 | 8/1975 | Barber et al. | 422/167 |
| 3,901,530 | 8/1975 | Radke | 280/741 |
| 4,005,876 | 2/1977 | Jorgensen et al. | 280/741 |
| 4,116,466 | 9/1978 | Gehrig | 280/736 |
| 4,131,299 | 12/1978 | Ono et al. | 280/736 |
| 4,131,300 | 12/1978 | Radke et al. | 280/737 |
| 4,158,696 | 6/1979 | Wilhelm | 422/166 |
| 4,203,787 | 5/1980 | Kirchoff et al. | 149/35 |
| 4,369,079 | 1/1983 | Shaw | 149/2 |
| 4,547,342 | 10/1985 | Adams et al. | 422/166 |

Primary Examiner—David L. Lacey
Assistant Examiner—Andrew J. Anderson
Attorney, Agent, or Firm—James C. Simmons; Gerald K. White

[57] ABSTRACT

A gas generator for automobile gas bags and the like includes a grain wherein a plurality of wafers of combustible gas generating material is arranged in a side by side array and a plurality of meshed cushion members is disposed in alternating relation between the wafers and compressed between the wafers in order to provide improved burn surface neutrality for more uniform inflator gas flow and better utilization of the gas generant, increased retention of solid residue in the combustion chamber for reduced plugging of the gas filters and cleaner inflation gas, a higher volumetric loading fraction so that the size and weight of the inflator may be reduced, and structural suspension of each individual wafer between the adjacent compressed cushion members to reduce breakage and damage of the wafers during the many years the inflator may remain in an automobile.

20 Claims, 1 Drawing Sheet

WAFER GRAIN GAS GENERATOR

The present invention relates to gas generators. More particularly, the present invention relates to gas generators that utilize the combustion of a solid fuel gas generant composition for the generation of a gas for such purposes as rapidly inflating vehicle passive restraint inflatable crash protection bags, i.e., gas bags.

Inflators such as shown in U.S. Pat. No. 4,547,342 to Adams et al and U.S. Pat. No. 4,005,876 to Jorgensen et al, both of which are assigned to the assignee of the present invention, contain gas generant in the form of pressed tablets (similar in shape to aspirin tablets), illustrated at 62 in Adams et al and at 10 in Jorgensen et al, which are randomly packed into the inflator combustion chamber. While the use of such pressed tablets is satisfactory for most purposes, the tablets provide an high initial surface area for burning and thus do not provide as soft of inflation onset as may be desired.

It is thus considered desirable to be able to tailor inflator performance to meet requirements for fast function time but with a relatively slow inflation onset. These requirements may be achieved by a gas generant configuration wherein the burn surface neutrality is improved or increased over that of the randomly packed compressed tablet configuration. Burn surface neutrality relates to the change in surface area being burned at different times during the combustion process. As the burn surface neutrality is increased for a particular gas generant configuration, the surface area being burned at any point in the combustion process is more uniform. An improved burn surface neutrality has the effect of reducing the initial pressure peak to thus provide a softer onset. An improved or increased burn surface neutrality with less surface area reduction at tailoff is also desired to allow a more uniform inflator gas flow history and better utilization of the gas generant.

The volumetric loading fraction obtainable with randomly packed pressed pellets is typically in the range of 55 to 57 percent. This is due to the volume lost in the interstitial spaces between the pellets. Because of volume restrictions for packaging air bag systems in a vehicle and the constant demands for reduced size and weight, it is considered desirable to increase this volumetric loading fraction for increased loading density so that the size of the combustion chamber may be made smaller relative to the amount of gas generant material.

It has been proposed for driver side inflators to form the pyrotechnic combustible material for inflators in the form of separate discs having a separator means disposed between adjacent discs to facilitate quick uniform combustion of the material. In this respect, see U.S. Pat. Nos. 3,901,530 to Radke and 4,131,300 to Radke et al. It has also been proposed with regard to passenger side inflaters to press the propellant into wafers and to configure each wafer in a manner to allow space for a propellant powder to be uniformly placed between the wafers to cushion each wafer from shock and vibration and for the purpose of insuring near instantaneous ignition of all wafers. In this respect, see U.S. Pat. No. 4,158,696 to Wilhelm.

While the proposed use of stacked wafers would permit higher volumetric loading, it is also considered desirable that they be stacked in such a configuration that good filtering of solid particulates can be obtained to provide a decreased plugging of filters and clean inflation gas while also allowing improved burn surface neutrality for smoother performance as previously discussed. The disposition of propellant powder between the wafers may furthermore undesirably result in a fast onset of burning for a higher initial pressure peak and a decreased burn surface neutrality.

The solid gas generant is typically hard and brittle when pressed into wafers or pellets and may be fractured or damaged if allowed to move or rattle around in the inflator combustion chamber. To insure satisfactory survival after many years in an automobile environment, it is also desirable that the gas generant be packaged in a manner which does not allow movement, breakage, or attrition by wearing against another gas generant wafer or a hard inflator surface.

It is therefore an object of the present invention to provide a gas generant configuration which has good burn surface neutrality for smooth inflator performance.

It is another object of the present invention to provide such a gas generant configuration wherein there is reduced plugging of filters and the inflation gas is clean.

It is a further object of the present invention to provide such a gas generant configuration wherein the gas generant material is not easily fractured or damaged during the many years the inflator must remain in an automobile.

It is still another object of the present invention to provide such a gas generant configuration which has a high volumetric loading fraction so that the combustion chamber size can be reduced.

It is yet another object of the present invention to provide a gas generant configuration for an inflator which is rugged, reliable, and inexpensive.

The above and other objects, features, and advantages of this invention will be apparent in the following detailed description of the preferred embodiments thereof which is to be read in connection with the accompanying drawings.

IN THE DRAWINGS

FIG. 1 is a side view, partly in section, of a gas generator which embodies the present invention; and FIG. 2 is a sectional view of the gas generator of FIG. 1 taken along the lines 2—2 thereof.

DETAILED DESCRIPTION OF THE PREFERRED EMBODIMENTS

Figure 1:
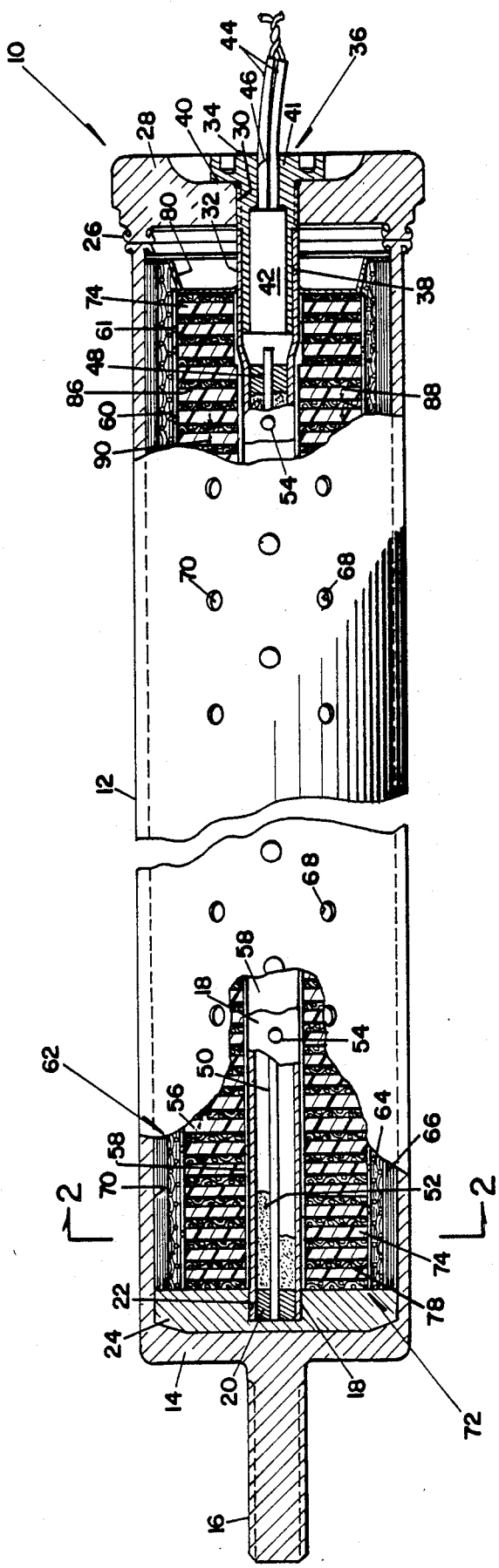

Referring to the drawings, there is shown generally at 10 a gas generator or inflator which may be used to inflate vehicle passive restraint inflatable crash protection bags on the passenger sides of vehicles. The inflator includes an elongated cylindrical member 12 and an end cap 14 integral therewith which closes one end thereof. The end cap 14 includes a threaded pin or fitting 16 integral therewith which may be used to attach the inflator 10 to a mounting bracket (not shown). Although the members 12, 14, and 16 are composed preferably of aluminum which is light weight, they may be composed of any other suitable material.

Extending generally over the length of the cylindrical member housing 12 and centrally located so as to be generally concentric with the housing 12 is a generally cylindrical metallic member 18 which unctions as an igniter tube. A plug member 20 of a suitable material such as compressible foamed material closes one end of the igniter tube 18, and the plugged end is positioned within a cavity 22 of a plate-like member 24 which engages the end cap 14 over the diameter thereof and which may be called an igniter tube locater, the cavity size being substantially the same as the outer diameter of the plugged end portion of the igniter tube 18.

Welded to the housing 12 by weld 26 or attached by other suitable means is an end cap 28. The end cap 28 has a cavity 30 centrally thereof and generally in alignment with the igniter tube 18. The open end portion 32 of the igniter tube 18 is flared outwardly. A metallic housing member 34 of an initiator assembly, generally illustrated at 36, is screwed into or otherwise suitably attached within the end cap cavity 30 and includes a cylindrical extension portion 38 which is slip fit or otherwise suitably attached within the flared end portion 32 of the igniter tube 18. Cavity 30 is enlarged near its outlet to provide a shoulder 40 to engage an outer enlarged portion 41 of the initiator housing 34.

Contained within the extension portion 38 is a squib 42 or other suitable initiator commonly known to those of ordinary skill in the art to which this invention pertains. The squib 42 is connected to electrical lead wires 44 which extend outwardly through an aperture 46 in the initiator housing 34. Contained within the igniter tube 18 adjacent the flared end portion 32 is a suitable plug 48. Extending through the plug 48 and over the length of the igniter tube 18 and into plug 20 is a suitable fuse 50 which is ignitable by the squib 42. Contained within the igniter tube 18 between the plugs 20 and 48 is a suitable pyrotechnic material illustrated at 52 which may be any of a variety of compositions meeting the requirements for rapid ignition and non-toxicity. A typical material for this use may be a granular mixture of 25 percent by weight of boron and 75 percent of potassium nitrate. This pyrotechnic material 52 is ignitable by the fuse 50. The plugs 20 and 48 may be made out of any suitable material such as, for example, compressible foam and function to suitably retain the pyrotechnic material 52 within the igniter tube 18.

The igniter tube 18 includes a plurality of perforations one of which is illustrated at 54 for routing of ignition gases from combustion of the pyrotechnic material 52 into the elongate combustion chamber illustrated at 5. A thin layer of aluminum foil 58 or other suitable rupturable material surrounds the perforated igniter tube 18 to maintain the integrity of the pyrotechnic material 52 inside of the igniter tube 18 until ignition at which time the pressure of ignition will rupture the foil 58 to allow ignition gases into the combustion chamber 56 to ignite combustible gas generating material which is contained therein and which will be discussed in greater detail hereinafter.

The combustion chamber 56 is enclosed over the length thereof by a perforated metal basket 60, composed of steel or other suitable material. Gases are led from the combustion chamber 56 through perforations 61 in the perforated basket 60 into a space between the perforated basket 60 and the wall of the housing 12 which contains a gas filtering assembly generally illustrated at 62. Adjacent the perforated basket 60 and surrounding the perforated basket 60 is a filter pack 64 which includes alternate layers of screen and ceramic filter paper. Surrounding the filter pack 64 is a screen pack 66 which includes 1½ layers of coarse screen, i.e., 8 mesh screen. However, in accordance with the present invention, the filtering assembly 62 may contain any other suitable arrangement of filtering components other than that described.

Suitably spaced over the length of the housing 12 and over a portion thereof circumferentially is a plurality of apertures 68 for release of generated gas from the combustion chamber 56 into a gas bag (not shown) which is suitably attached thereto. Covering the inside wall of the housing 12 to provide an hermatic seal for the inflator is a layer of aluminum foil 70 or other suitable material which is rupturable by the gases generated in the combustion chamber 56. The apertures 68 may be positioned over a little less than one-half of the surface circumferentially of the inflator housing 12. The 1½ layers of screen for the screen pack 66 are wrapped to provide a double layer of screen in front of the apertures 68.

Until now, what has been described is a typical gas generator housing an ignition assembly for a passenger inflater. An alternative embodiment of such an housing and assembly which may also be used in practicing the present invention is shown and described in the aforesaid U.S. Pat. No. 4,005,876 to Jorgensen et al, which is hereby incorporated herein by reference.

For conventional inflators which use gas generant in the form of randomly packed pressed tablets such as pellets which have an outside diameter typically of 0.375 inches and a thickness typically of 0.150 inches, the ratio of the maximum or initial surface area to the average surface area may typically be 1.79 which is indicative of a high initial gas bag fill rate which then tapers off. Such randomly packed pellets may also typically have a ratio of final surface area to initial surface area of about 0.18 which also indicates a low burn surface neutrality. Burn surface neutrality refers to the degree to which the surface area of the gas generant is uniform throughout the combustion process. As the ratio of surface areas at two different times during this process approaches a ratio of one, it may be said that the burn surface neutrality is increased. High burn surface neutrality is desired to provide a softer onset of inflation, a more uniform gas bag fill rate, and better utilization of the gas generant material.

The volumetric loading fraction obtainable with randomly packed pressed pellets is typically in the range of 55 to 57 percent because of the volume lost in the interstitial spaces between the pellets. Volumetric loading density refers to the ratio of the volume of gas generant material in an inflator combustion chamber to the volume of the combustion chamber. It is desirable to increase the loading density and thus reduce the combustion chamber size for a given volume of gas generant for reduced size and weight of the inflator.

Figure 2:
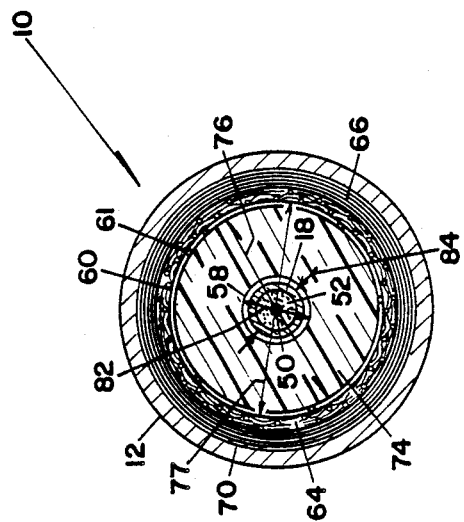

In order to provide improved or increased burn surface neutrality as well as increased volumetric loading fraction of the gas generant material in the inflator 10, disposed within the combustion chamber 56 in accordance with the present invention is a grain generally illustrated at 72 which is composed of a plurality of wafers 74 of combustible gas generating material which are arranged in a side by side array and spaced apart from each other. The gas generating material may be one of any number of compositions meeting the requirements of burning rate, non-toxicity, and flame temperature. One composition which may be utilized is that described in U.S. Pat. No. 4,203,787 to Schneiter et al. Another composition that may advantageously be utilized is that described in U.S. Pat. No. 4,369,079 to Shaw. Both of these patents, which are incorporated herein by reference, are assigned to the assignee of the present invention. As shown in the drawings, the wafers 74 have the shape of washers whose inner and outer diameters are generally the same as the inner and outer diameters respectively of the combustion chamber 56, i.e., as shown in FIG. 2, they have substantially the same shape as the cross-sectional shape of the combustion chamber. As shown, the igniter tube 18 passes through the central core of the wafers 74. Wafers 74 may typically have a thickness of 0.20 inches, an outer diameter, illustrated at 76 in FIG. 2, typically of 1.3 to 2.0 inches which is substantially equal to (but slightly smaller than) the combustion chamber diameter 77, and have a central hole diameter, illustrated at 82 in FIG. 2, typically of 0.25 to 0.50 inches which is substantially equal to (but slightly larger than) the outer diameter 84 of the igniter tube 18 whereby the wafers 74 extend from the igniter tube 18 radially outwardly to efficiently fill the combustion chamber 56. The volumetric loading fraction of the stacked wafer grain 72 is dependent upon the wafer thickness and the distance the wafers are spaced apart from each other. If the wafers are 0.150 inches thick and are spaced apart from each other by a distance of 0.055 inches, the volumetric loading density would be approximately 73 percent. For stacked wafer grains, volumetric loading densities in the range from 65 to 80 percent are believed to be practical.

The solid gas generant is hard and brittle when pressed into wafers and may be fractured or damaged if allowed to move or rattle around in the inflator combustion chamber. To insure satisfactory survival after many years in an automobile environment, the gas generant should be packaged in a manner which does not allow movement, breakage, or attrition by wearing against another gas generant wafer or a hard inflator surface. In addition, in order to reduce the plugging of filters and provide cleaner gas to the gas bag, it is desirable to retain an increased amount of solid residue in the combustion chamber 56. In order to effect increased retention of solid residue in the combustion chamber and improved filtration capability as well as to prevent movement breakage or wearing away of the wafers 74 during the many years they may be in an automobile environment in addition to maintaining the increased burn surface neutrality of the wafers and the higher volumetric loading fraction thereof, in accordance with the present invention a plurality of meshed compressible cushion members 78 are disposed in alternating relation between the wafers 74 and compressed between the wafers 74. Like the wafers 74, these cushion members 78 have a central core to allow installation of the igniter tube 18 and have outer and inner diameters approximately equal to the outer and inner diameters respectively of the wafers 74. The cushion members 78 are formed from a screen or other suitable meshed material in order that a gas flow path may be created which allows ignition of all the flat wafer surfaces from the central ignition source 52. The cushion members 78 are also meshed to provide an open path for the combustion products to flow from the gas generant surfaces toward the surrounding filtering assembly 62 on their way out of the inflator and into the gas bag. The cushion members 78 are preferably formed from wire screen, which preferably is in the range of about 20 to 50 mesh, in order that they may serve as a cool surface to condense and collect solid combustion products in the combustion chamber 56 so as to reduce clogging of the primary particulate and cooling filters in the filtering assembly 62 so that cleaner inflation gas may thereby be provided to a gas bag. The screens 86 from which the cushion members are made are preferably pressed into a wave form as illustrated in FIG. 1 to provide a spring or cushion effect as well as increased transverse flow area for combustion gases. The thickness, illustrated at 88, of a formed screen cushion member 78 is preferably from about 1.5 to 5 times the thickness, illustrated at 90, of the unpressed screen.

The array of alternating wafers 74 and cushion members 78 is compressed and held in the combustion camber 56 by a disc retainer member 80 to structurally suspend each individual wafer 74 between compressed adjacent cushion members 78 to prevent movement breakage of the wafers or wearing of the wafers against other wafers or a hard inflator surface or any other damage to the wafers.

By suitably selecting the thickness of the cushion members 78 when compressed in the combustion chamber 56 as previously discussed, an improved volumetric loading fraction in the range of 65 to 80 percent may be obtained. As previously discussed, with a wafer having a thickness typically of 0.150 inches and a cushion member having a thickness when compressed of 0.055 inches, the volumetric loading density would be approximately 73 percent, as compared to a range of 55 to 57 percent which is typical of the randomly packed pressed tablets.

For a stacked wafer grain wherein the wafers have outside diameters 76 of 1.50 inches, inside diameters of 0.4 inches, and thicknesses of 0.150 inches and wherein the cushion members have thicknesses when compressed of 0.055 inches, the ratio of maximum or initial surface area to average surface area may be typically 1.27, which indicates a substantially improved burn surface neutrality over a typical ratio of 1.79 for randomly packed pressed pellets having outside diameter of 0.375 inches and thicknesses of 0.150 inches. Further, the ratio of the final surface area to the initial surface area of such a stacked wafer grain may be typically 0.57, which also indicates an improved burn surface neutrality over the pellets at a typical ratio of 0.18. Thus the stacked wafer grain 72 of the present invention is additionally provided so that an improved burn surface neutrality may be achieved for more uniform inflator gas flow and better utilization of the gas generant.

In accordance with an alternative embodiment of the present invention, the pellets, which are shown at 10 in the Jorgensen et al patent, are replaced with a grain similar to the grain 72 to achieve the advantages previously discussed with respect to the embodiment of FIGS. 1 and 2 of this application.

Functioning of the inflator 10 begins with an electrical signal from a crash sensor (not shown) through lead wires 44 to the initiator 42. The initiator 42 fires and initiates burning of the fuse 50 which in turn effects combustion of the pyrotechnic material 52. The gases from burning of the pyrotechnic material 52 burst through the perforations 54 in the igniter tube 18 and the aluminum foil 58 to ignite the plurality of wafers 74 in the combustion chamber 56. The burning of the wafers 74 releases inflator gases which flow through the meshed cushion members, which cool and remove some particulate residue therefrom, and then leave the combustion chamber 56 through the perforated basket 60. The inflator gases then flow through the filter pack 64 then the screen pack 66 which further cool and remove particulate residue therefrom. The inflator gases then burst through the aluminum foil 70 and exit the inflator through apertures 68 in the housing 12 and enter a gas bag (not shown).

In summary, the stacked wafer grain 72 is provided to achieve improved burn surface neutrality for more uniform inflater gas flow and better utilization of the gas generant, retention of increased amounts of solid residue in the combustion chamber for improved filtration capability and cleaner inflation gas, a higher volumetric loading fraction so that reduced size and weight inflators may be provided, and the structural suspension of each individual wafer for reduced breakage or damage during the many years that the inflator may remain in an automobile.

It is to be understood that the invention is by no means limited to the specific embodiments which have been illustrated and described herein, and that various modifications thereof may indeed be made which come within the scope of the present invention as defined by the appended claims.

I claim:

1. A gas generator comprising a combustion chamber means, a plurality of wafers of combustible gas generating material disposed within said combustion chamber means and spaced from each other and arranged in a side by side array, a plurality of meshed cushion members disposed in alternating relation between said wafers and compressed between said wafers, means for igniting said wafers, and means for routing generated gas from said combustion chamber means.

2. A gas generator according to claim 1 wherein said combustion chamber means is elongate and has an inner diameter, said igniting means includes an igniter tube which extends longitudinally through said combustion chamber means and is disposed generally concentric therewith and which has an outer diameter, said wafers and said cushion members have the shapes of washers through which said igniter tube is inserted, and each said wafer has an outer diameter equal substantially to said combustion chamber means inner diameter and a central hole diameter equal substantially to said igniter tube outer diameter.

3. A gas generator according to claim 1 wherein said wafers and said cushion members are sized such that the volumetric loading density of said combustion chamber means is at least about 65 percent.

4. A gas generator according to claim 1 wherein said cushion members are composed of screen wire.

5. A gas generator according to claim 4 wherein said screen wire has a size in the range of about 20 to 50 mesh.

6. A gas generator according to claim 4 wherein each said cushion member has a wave configuration.

7. A gas generator according to cushion members have a thickness which about 1.5 and 5 times the thickness of the unwaved screen wire.

8. A gas generator according to claim 7 further comprising a retainer means for compressing said array of wafers and cushion members to structurally suspend each said wafer between compressed respective ones of said cushion members.

9. A gas generator according to claim 8 wherein said combustion chamber means is elongate and has an inner diameter, said igniting means includes an igniter tube which extends longitudinally through said combustion chamber means and is disposed generally concentric therewith and which has an outer diameter, said wafers and said cushion members have the shapes of washers through which said igniter tube is inserted, and each said wafer has an outer diameter equal substantially to said combustion chamber means inner diameter and a central hold diameter equal substantially to said igniter tube outer diameter.

10. A gas generator according to claim 9 wherein said wafers and said cushion members are sized such that the volumetric loading density is at least about 65 percent.

11. A method of assembling a plurality of wafers of combustible gas generating material within a gas generator combustion chamber comprising:
   a. disposing the wafers in the combustion chamber in a spaced side-by-side array;
   b. disposing meshed cushion members in alternating relation between the wafers; and
   c. compressing the array of wafers and cushion members to structurally suspend the wafers spaced from each other between the cushion members.

12. A method according to claim 11 wherein the combustion chamber is elongate and an igniter tube extends longitudinally through and is generally concentric with the combustion chamber, the method further comprising forming the wafers and cushion members in the shape of washers and disposing them in the combustion chamber with the igniter tube inserted therethrough, and sizing the wafers to have an outer diameter equal substantially to the combustion chamber inner diameter and a central hole diameter equal substantially to the igniter tube outer diameter.

13. A method according to claim 11 further comprising sizing the wafers and cushion members to provide a combustion chamber volumetric loading density of at least about 65 percent.

14. A method according to claim 11 further comprising composing the cushion members out of screen wire having a size in the range of about 20 to 50 mesh.

15. A method according to claim 11 further comprising composing the cushion members out of screen wire.

16. A method according to claim 15 further comprising forming the screen wire in a wavy configuration such that the cushion members have a thickness which is between about 1.5 and 5 times the thickness of the unformed screen wire.

17. A method according to claim 15 further comprising forming the screen wire in a wavy configuration.

18. A method according to claim 17 wherein the combustion chamber is elongate and an igniter tube extends longitudinally through and is generally concentric with the combustion chamber, the method further comprising forming the wafers and cushion members in the shape of washers and disposing them in the combustion chamber with the igniter tube inserted therethrough, and sizing the wafers to have an outer diameter equal substantially to the combustion chamber inner diameter and a central hole diameter equal substantially to the igniter tube outer diameter.

19. A method according to claim 18 further comprising sizing the wafers and cushion members to provide a combustion chamber volumetric loading density of at least about 65 percent.

20. An automobile gas bag inflator comprising a combustion chamber means, a plurality of wafers of combustible gas generating material disposed within said combustion chamber means and spaced from each other and arranged in a side by side array, a plurality of meshed cushion members disposed in alternating relation between said wafers and compressed between said wafers, means for igniting said wafers, and means for routing generated gas from said combustion chamber means.

* * * * *

UNITED STATES PATENT AND TRADEMARK OFFICE
CERTIFICATE OF CORRECTION

PATENT NO. : 4,890,860

DATED : Jan. 2, 1990

INVENTOR(S) : Fred E. Schneiter

It is certified that error appears in the above-identified patent and that said Letters Patent is hereby corrected as shown below:

Column 2, line 64, delete "unctions" and insert --functions--.

Column 3, line 44, delete numeral "5" and insert --56--.

Column 7, Claim 7, line 1, after "according to" insert
-- Claim 6 wherein said--.

Signed and Sealed this

Eleventh Day of February, 1992

Attest:

HARRY F. MANBECK, JR.

*Attesting Officer*     *Commissioner of Patents and Trademarks*